United States Patent
Clarke

(10) Patent No.: US 9,903,199 B2
(45) Date of Patent: *Feb. 27, 2018

(54) USE OF METAMATERIAL TO ENHANCE MEASUREMENT OF DIELECTRIC PROPERTIES

(71) Applicant: SCHLUMBERGER TECHNOLOGY CORPORATION, Sugar Land, TX (US)

(72) Inventor: Andrew Clarke, Haslingfield (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 583 days.

This patent is subject to a terminal disclaimer.

(21) Appl. No.: 14/355,250

(22) PCT Filed: Nov. 13, 2012

(86) PCT No.: PCT/IB2012/056381
§ 371 (c)(1),
(2) Date: Apr. 30, 2014

(87) PCT Pub. No.: WO2013/072844
PCT Pub. Date: May 23, 2013

(65) Prior Publication Data
US 2014/0298900 A1    Oct. 9, 2014

Related U.S. Application Data

(60) Provisional application No. 61/559,448, filed on Nov. 14, 2011.

(51) Int. Cl.
*E21B 49/00*     (2006.01)
*G01V 3/26*      (2006.01)
(Continued)

(52) U.S. Cl.
CPC ............... *E21B 49/00* (2013.01); *G01V 3/26* (2013.01); *H01Q 1/04* (2013.01); *H01Q 15/0086* (2013.01); *H01Q 19/062* (2013.01)

(58) Field of Classification Search
CPC ...... G01N 24/08; G01N 24/082; E21B 49/00; E21B 49/08
(Continued)

(56) References Cited

U.S. PATENT DOCUMENTS 3,286,163 A *  11/1966  Holser
4,686,653 A     8/1987  Staron et al.
(Continued)

FOREIGN PATENT DOCUMENTS

EP   1860458 A1   11/2007
EP   2015109      1/2009
(Continued)

OTHER PUBLICATIONS

International Search Report of PCT Application No. PCT/IB2012/056381 dated Mar. 29, 2013: pp. 1-2.
(Continued)

*Primary Examiner* — Walter L Lindsay, Jr.
*Assistant Examiner* — Milton Gonzalez

(57) ABSTRACT

Systems, tools, and methods for measurement of a property of a solid body or fluid involve an electromagnetic measurement tool that includes a transmitter configured to transmit electromagnetic energy, a receiver configured to receive the electromagnetic energy, and a metamaterial element comprising a negative refractive index. The metamaterial element may focus the electromagnetic energy. The electromagnetic tool may be placed adjacent the solid body or fluid, electromagnetic energy may be transmitted via the
(Continued)

transmitter, and the electromagnetic energy may be received with the receiver to measure a property of the solid body or fluid.

43 Claims, 12 Drawing Sheets

(51) Int. Cl.
  *H01Q 15/00* (2006.01)
  *H01Q 19/06* (2006.01)
  *H01Q 1/04* (2006.01)

(58) Field of Classification Search
  USPC .................................. 324/303, 323, 324
  See application file for complete search history.

(56) References Cited

U.S. PATENT DOCUMENTS

| | | | |
|---|---|---|---|
| 4,739,272 A * | 4/1988 | Griffin | |
| 4,780,678 A * | 10/1988 | Kleinberg | |
| 5,210,406 A | 5/1993 | Beran et al. | |
| 5,406,206 A | 4/1995 | Safinya et al. | |
| 5,485,743 A | 1/1996 | Taherian et al. | |
| 6,100,696 A * | 8/2000 | Sinclair | |
| 6,831,470 B2 | 12/2004 | Xie et al. | |
| 6,915,707 B2 | 7/2005 | Nyfors et al. | |
| 7,624,652 B2 | 12/2009 | Wee et al. | |
| 7,629,941 B2 | 12/2009 | Pendry et al. | |
| 7,712,380 B2 | 5/2010 | Xie | |
| 7,908,930 B2 | 3/2011 | Xie et al. | |
| 8,159,223 B2 | 4/2012 | Luekeke et al. | |
| 8,224,588 B2 | 7/2012 | Wee | |
| 2001/0038287 A1 | 11/2001 | Amini | |
| 2003/0137301 A1 | 7/2003 | Thompson et al. | |
| 2003/0189511 A1 | 10/2003 | Lasky et al. | |
| 2006/0028385 A1 | 2/2006 | Davis et al. | |
| 2007/0171536 A1 * | 7/2007 | Tsukagoshi | |
| 2008/0165079 A1 * | 7/2008 | Smith | |
| 2008/0252293 A1 | 10/2008 | Lagae et al. | |
| 2009/0253227 A1 * | 10/2009 | Defries | |
| 2010/0025112 A1 * | 2/2010 | Sroka | |
| 2010/0033389 A1 * | 2/2010 | Yonak | |
| 2010/0079354 A1 * | 4/2010 | Lam | |
| 2011/0267074 A1 | 11/2011 | Xie et al. | |
| 2011/0273319 A1 | 11/2011 | Mossallael | |

FOREIGN PATENT DOCUMENTS

| | | |
|---|---|---|
| GB | 2359435 | 8/2001 |
| WO | 2006089618 | 8/2006 |
| WO | 2009006975 | 1/2009 |
| WO | 2009010132 | 1/2009 |
| WO | 2009143186 A1 | 11/2009 |
| WO | 2012094162 | 7/2012 |
| WO | 2014027322 | 2/2014 |

OTHER PUBLICATIONS

International Search Report and Written Opinion of PCT Application No. PCT/IB2013/056644 dated Mar. 5, 2014: pp. 1-20.

Alici et al., "Radiation properties of a split ring resonator and monopole composite," phys. stat. sol. (b). 2007, vol. 244 (4): pp. 1192-1196.

Pendry, "Negative Refraction Makes a Perfect Lens," Physical Review Letters, Oct. 2000, vol. 85(18): pp. 3966-3969.

Veselago, "The Electrodynamics of Substances with Simultaneously Negative Values of $\epsilon$ and $\mu$," Soviet Physics Uspekhi, Jan.-Feb. 1968, vol. 10(4): pp. 509-514.

* cited by examiner

USE OF METAMATERIAL TO ENHANCE MEASUREMENT OF DIELECTRIC PROPERTIES

CROSS-REFERENCE TO RELATED APPLICATIONS

This application is a U. S. National Stage Application under 35 U.S.C. § 371 and claims priority to Patent Cooperation Treaty Application No. PCT/IB2012/056381 filed Nov. 13, 2012, which claims the benefit of U.S. Provisional Patent Application Ser. No. 61/559448 filed Nov. 14, 2011, both of which are incorporated herein by reference in their entireties.

BACKGROUND

The present invention relates generally to methods and systems for investigating the interior properties of solids and the properties of fluid flows using electromagnetic energy, and more particularly but not by way of limitation to investigating methods and systems for measuring one or more properties of a wellbore and/or investigating interiors of porous matrixes and properties of multiphase flows. Merely by way of example, the described methods and systems may be used to enhance a penetration of electromagnetic energy transmitted within a material to enhance and investigation depth and in some examples the enhanced investigation may be used in the wellbore to enhance the measurement of the one or more properties of the wellbore.

Various tools and devices are currently used within wellbores to make a record of geologic formations penetrated by the borehole. Such practice is commonly referred to as well logging or borehole logging. Such records may be made by physically extracting materials from the borehole for above ground inspection or by placing one or more instruments within the borehole and recording data provided by the instruments. The data provided by the instruments is usually recorded while the instruments are being extracted or pulled from the borehole. The instruments may measure electrical, acoustic, radioactive, electromagnetic, nuclear magnetic resonance, and other properties of the borehole. Well logging may be performed during various phases of a well's development, such as during drilling, production, and the like.

The recorded data may be analyzed to determine the porosity, permeability, fluid content, and the like of geologic formations within the borehole. This information may be used to locate and/or predict hydrocarbon or other deposits within the geologic formations penetrated by the borehole and to extract hydrocarbons or other materials therefrom. Current well logging instruments may be improved to provide improved well logging records and thereby, improve the location and/or prediction of hydrocarbon or other deposits within the geologic formations.

BRIEF SUMMARY

In one embodiment, the present disclosure provides an electromagnetic measurement tool for measuring a property of a solid body or a fluid flow. The electromagnetic measurement tool may include a tool body and an antenna coupled with the tool body and configured for placement adjacent the solid body or fluid flow. The antenna may include at least one transmitter configured to transmit electromagnetic energy, at least one receiver configured to receive the electromagnetic energy, and a metamaterial element having a negative refractive index, the metamaterial element focusing the electromagnetic energy into the solid body or fluid flow. In some embodiments of the invention, methods and systems for measuring one or more properties of a wellbore are provided. In such embodiments, the metamaterial element may focus electromagnetic energy along a plane in which the borehole lies.

The solid body may include a porous matrix that may include a fluid and/or a mineral, a rock formation, and/or a rock core. Merely by way of example, the fluid flow may be a fluid flowing in a pipe, a fluid sample, fluid flowing in a wellbore and/or the like and the fluid may comprise oil, water, a multiphase fluid, and/or gas. The metamaterial element may include a material having a negative relative permittivity and/or a negative relative permeability over a range of frequencies. In some embodiments, the metamaterial element may be a lens positioned atop the antenna, a coating applied atop the antenna, a lens disposed adjacent to or coupled with the antenna and/or the like.

Merely by way of example, in some embodiments the lens may have a thickness of between about 1 mm and about 30 mm and/or may have a semicircular cross section or configuration having a radius between about 13 cm and about 17 cm. The tool body may be an elongate tool configured for placement within a borehole and the antenna may be configured for placement adjacent a wall of the borehole. The elongate tool body may also include an arm laterally deployable against a second wall to force the antenna into contact with the wall. The antenna may be coupled with the elongate tool body so that the antennae is laterally deployable from the elongate tool body. The antenna may be rotatable relative to the elongate tool body.

In some embodiments, the electromagnetic measurement tool is a wireline tool deployable within the borehole to measure properties associated with a rock formation for oil exploration. An outer shell may be positioned atop the metamaterial element or lens so that the outer shell contacts a wall of a borehole when the electromagnetic measurement tool is positioned within the borehole. The metamaterial element or lens may not be positioned over the receiver. The antenna may also include a second metamaterial element that focuses electromagnetic energy within a frequency range different than a frequency range of electromagnetic energy focused by the metamaterial element. The second metamaterial element may be a second lens positioned atop at least a portion of a first metamaterial lens.

In one embodiment, an absolute value of the refractive index of the metamaterial element may be substantially equivalent to an absolute value of the refractive index of the solid body or fluid. The metamaterial element may focus electromagnetic energy based on a polarization of the electromagnetic energy. Merely by way of example, the electromagnetic measurement tool may be a nuclear magnetic resonance scanner, a dipole electric scanner, a multiphase flow meter, and/or the like. In some embodiments, the metamaterial element may include an array of resonators sized smaller than the wavelength of a focused electromagnetic wave and the permeability and permittivity of at least one resonator may be negative over a range of frequency.

In another embodiment, the present disclosure provides a system for measuring a property of a borehole. The system may include a computing device comprising a processor and memory. The computing device may be configured to measure the property of the borehole. The system may also include a deployment device configured to deploy one or more tools within the borehole. The system may further include an elongate tool body coupled with the deployment device for placement of the elongate tool body within the borehole and an antenna coupled with the elongate tool body and communicatively coupled with the computing device. The antenna may include at least one transmitter configured to transmit one or more frequencies of electromagnetic energy. The antenna may also include at least one receiver configured to receive the electromagnetic energy and to provide information associated with the electromagnetic wave to the computing device to measure the property of the borehole. The antenna may further include a metamaterial element having a negative refractive index that focuses the electromagnetic energy.

In yet another embodiment, the present disclosure provides a method of enhancing a measurement of an electromagnetic measurement tool. The method may include providing an electromagnetic measurement tool having: a transmitter configured to transmit electromagnetic energy, a receiver configured to receive the electromagnetic energy, and a metamaterial element comprising a negative refractive index, the metamaterial element focusing the electromagnetic energy. The method may also include placing the electromagnetic measurement tool adjacent a solid body or fluid and transmitting electromagnetic energy via the transmitter. The method may further include receiving the electromagnetic energy with the receiver to measure a property of the solid body or fluid.

The method may additionally include placing the electromagnetic measurement tool within a borehole to measure properties associated with a rock formation for oil exploration. The method may additionally include configuring the metamaterial element so that an absolute value of the refractive index of the metamaterial element is substantially equivalent to an absolute value of the refractive index of the solid body or fluid.

In some embodiments, the metamaterial element may focus electromagnetic energy in a range between about 20 MHz and about 50 GHz. In another embodiment, the metamaterial element may focus electromagnetic energy in the range between about 20 MHz and about 4 GHz. In some embodiments, the negative refractive index may be a value between about −1 and about −20. In another embodiment, the negative refractive index may be a value between about −1 and about −4. The metamaterial element may focus electromagnetic energy based on a polarization of the electromagnetic energy. In one embodiment, the metamaterial element focuses electromagnetic energy transmitted within a first frequency range and the method additionally includes positioning an additional metamaterial element atop the transmitter, the additional metamaterial element focusing electromagnetic energy transmitted within a second frequency range different than the first frequency range.

In yet another embodiment, the present disclosure provides a method for enhancing a measurement of a scanner device in a borehole. The method may include providing a scanner device configured to transmit electromagnetic energy into a geologic formation within the borehole. The method may also include positioning a metamaterial element comprising a negative refractive index atop the scanner device, the metamaterial element enhancing a penetration of the electromagnetic energy within the geologic formation. The method may further include placing the scanner device within the borehole and positioning the scanner device adjacent a wall of the borehole. The method may additionally include transmitting electromagnetic energy via the scanner device into the geologic formation within the borehole and receiving a signal via a receiver of the scanner device in response to the transmitted electromagnetic energy to measure a property of the geologic formation. A depth measurement of the signal may be enhanced by the enhanced penetration of the electromagnetic energy within the geologic formation.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1A:
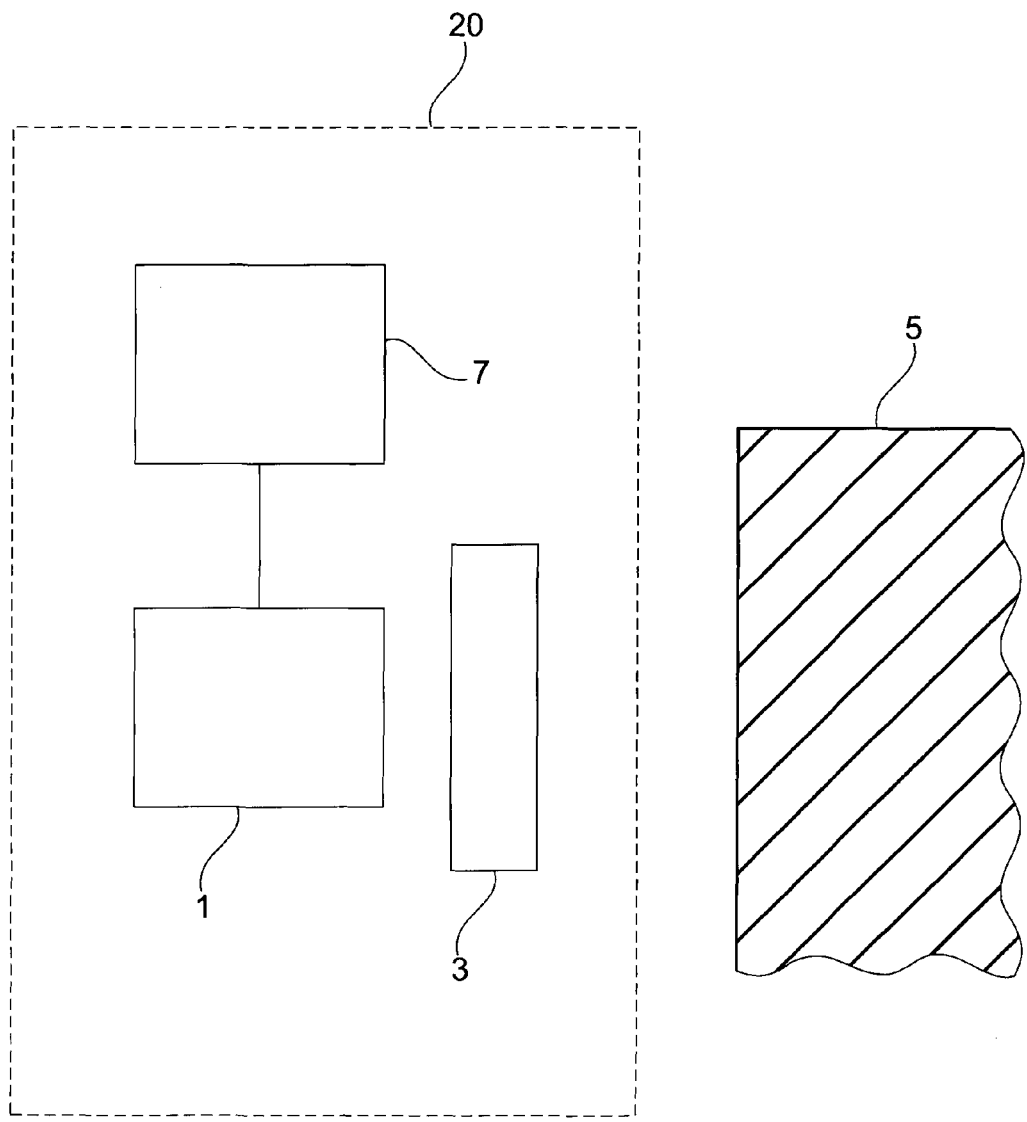
FIG. 1A depicts a block diagram of an embodiment of a system for measuring a property of a solid/fluid, according to an embodiment of the invention.

In the appended figures, similar components and/or features may have the same reference label. Where the reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Figure 7A:
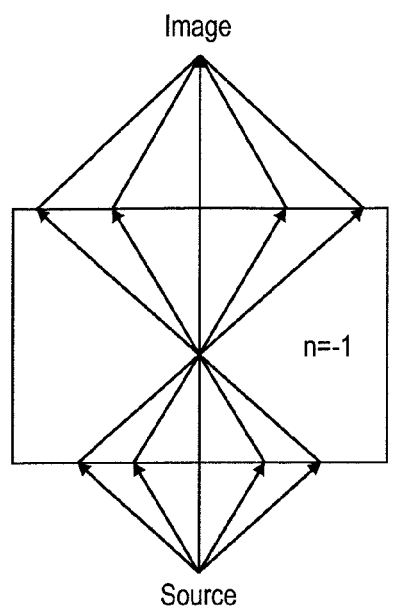
FIGS. 7A-7C illustrate various properties of a metamaterial that may be used in the embodiments described herein.
Figure 7B:
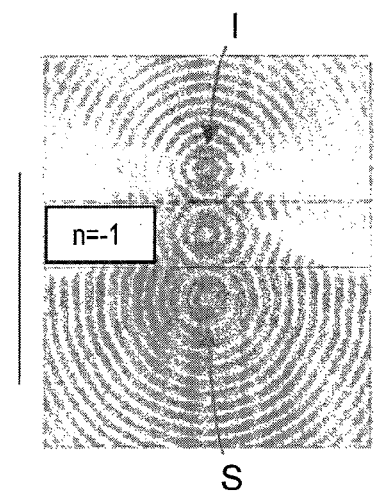
Figure 7C:

A metamaterial is defined as a macroscopic composite of periodic or non-periodic structure, whose function is due to both the cellular architecture and the chemical composition. Metamaterials may have a designed, non-naturally occurring, response to RF and microwave electromagnetic fields, among other fields. A metamaterial element or lens may be perfect in the sense that it manipulates the near field and leads to resolution not limited by diffraction. In particular, a slab of refractive index having a value of approximately minus one (−1) in air (i.e., a refractive index=1) would focus a source S to an image I as illustrated in FIGS. 7A-C. This configuration allows sub-wavelength thickness lenses or elements to be created, i.e. lenses that are physically thin.

In one embodiment, the present disclosure provides a system for measuring a property of a borehole. The system may include a computing device that is configured to analyze data and/or measure the property of the borehole, which may include dielectric properties of geologic formations penetrated by the borehole. This information may be used to locate and/or determine the presence of hydrocarbon or other deposits within the geologic formation, which may be extracted from the borehole. The system may also include a deployment device that is configured to deploy or otherwise position tools within the borehole.

In one embodiment, a scanner device may be coupled with the deployment device for placement within the borehole. The scanner device may be a wireline tool and may include an antenna that is communicatively coupled with the computing device so as to provide data to the computing device for analysis and/or measurement. The antenna may include one or more transmitters that transmit electromagnetic energy and may also include one or more receivers that receive a signal (e.g., electromagnetic energy) in response to the transmitted electromagnetic energy. In some embodiments the electromagnetic energy may be radiated into and/or from a surrounding structure, while in other embodiments the transmitter and receiver may be electromagnetically coupled while no waves propagate into and/or from the structure. The propagation of the waves may depend on frequency and/or surrounding material properties. The signal, or a portion thereof, either modified or unmodified may be provided to the computing device for analysis and/or measurement. A metamaterial element may be operable with the antenna or as part of the antenna to enhance focus transmitted electromagnetic energy, enhance a penetration of the electromagnetic energy within the geologic formation, enhance the signal received at the receiver, and/or the like so as to enhance a measurement of the geologic formation within the borehole.

In another embodiment, the scanner device may be a run on a slickline inserted into the borehole and the scanner device may include a computing means and storage device so that data is gathered and/or stored by the scanner device and extracted from the scanner device for analysis when the scanner device is extracted from the borehole.

In another embodiment, the scanner device and metamaterial element may be used for above ground application, such as for analyzing a core sample, investigating a solid material and/or investigating properties of a fluid flow. For example, by using an antenna and a metamaterial an electromagnetic signal may be generated by the antenna and focused by the metamaterial into the solid material and/or the fluid flow. In this way, embodiments of the present invention may provide systems and methods for enhanced investigation into the solid material and/or fluid flow. In some embodiments, the antenna may comprise a transducer or the like for producing an electromagnetic signal. The enhanced investigation depths provided by use of the metamaterial may provide for more accurate and/or deeper investigation into the solid material and/or fluid flow and/or the use of lower energy electromagnetic signals to achieve investigation depths/accuracies only previously provided by higher energy signals. Matching of absolute values of the refractive index of the material/fluid and the metamaterial may provide enhanced investigation probing of the material/fluid by the electromagnetic signal.

In another embodiment, the present disclosure provides an electromagnetic measurement tool or scanner device that may be used with the systems described herein to measure one or more properties of a borehole, such as the porosity, permeability, fluid content, and the like of geologic formations within the borehole. The electromagnetic measurement tool may include an elongate tool body configured for placement within the borehole. The elongate tool body may be coupled with an antenna that includes one or more transmitters, one or more receivers, and a metamaterial element that enhances a focus of transmitted electromagnetic energy, enhances a depth of penetration or propagation of electromagnetic energy within the geologic formation of the borehole, and/or enhance a signal received at the receiver.

In yet another embodiment, the present disclosure provides methods for measuring one or more properties of a borehole using the tools and/or systems described herein. A method for measuring one or more properties of a borehole may include providing an electromagnetic measurement tool, such as those described herein. The electromagnetic tool may be placed within the borehole and one or more electromagnetic energy electromagnetic energy may be transmitted from the electromagnetic tool. In response to the transmitted electromagnetic energy, a signal may be measured by the electromagnetic tool. The transmitted electromagnetic energy and/or the signal that is received may be enhanced by a metamaterial element of the electromagnetic tool.

Referring to FIG. 1A, illustrated is a system 20 for measuring a property of a solid/fluid 5. The system 20 may comprise an electromagnetic sensing device 1 and an antenna 3. In an embodiment of the present invention, the antenna 3 may comprise a metamaterial, where in embodiments of the present invention may comprise a negative permeability and/or a negative permittivity. In embodiments of the present invention, the antennae 3 may increase/extend the zone of investigation of the electromagnetic sensing device 1 within a material being investigated.

Merely by way of example and not by means of limitation, in some embodiments of the present invention, the electromagnetic sensing device 1 may comprise a sensor configured to use electromagnetic energy to sense properties inside a solid material and/or a fluid, such as for example a nuclear magnetic resonance sensor, a microwave sensor, a radio wave sensor and/or the like.

In an embodiment of the present invention, the system 20 may be held appurtenant to a solid/fluid 5 and/or, in the case of a fluid, within the fluid and the sensed property of the solid/fluid 5 may include the dielectric properties (e.g., permittivity, conductivity, permeability, and the like) of the solid/fluid 5. The sensed information may be used to characterize/interpret properties of the solid/fluid 5. For example, phases of a multiphase fluid may be interpreted using the system 20. In fluid analysis, the permittivity, conductivity, permeability, and the like may be used to measure/interpret fluid flow and, as such, the system 20 may be used to look inside the solid/fluid 5 to provide for interpretation/measurement of a fluid flowing adjacent to and/or around the system 20. Similarly, properties of a rock may be interpreted using the system 20. For example, NMR techniques and the like may be used to look inside a solid material such as rock and the antennae 3 may be used to increase the "effective penetration" of the electromagnetic sensing device 1 inside the solid material. In aspects of the present invention, flowmeters and sensor systems for investigating inside solid bodies that use, for example, radio frequency electromagnetic energy to probe inside the fluid/solid may be adapted by using the antennae 3 to provide for, among other things, increased sensitivity, increased depth of investigation and/or the like.

System 20 may include a processor 7 that may comprise processing and memory capabilities. The processor 7 may be used to process/interpret properties of the solid/fluid 5 from an output from the electromagnetic sensing device 1/antenna 3 and/or control the operation of the electromagnetic sensing device 1 and/or the antennae 3.

Figure 1B:
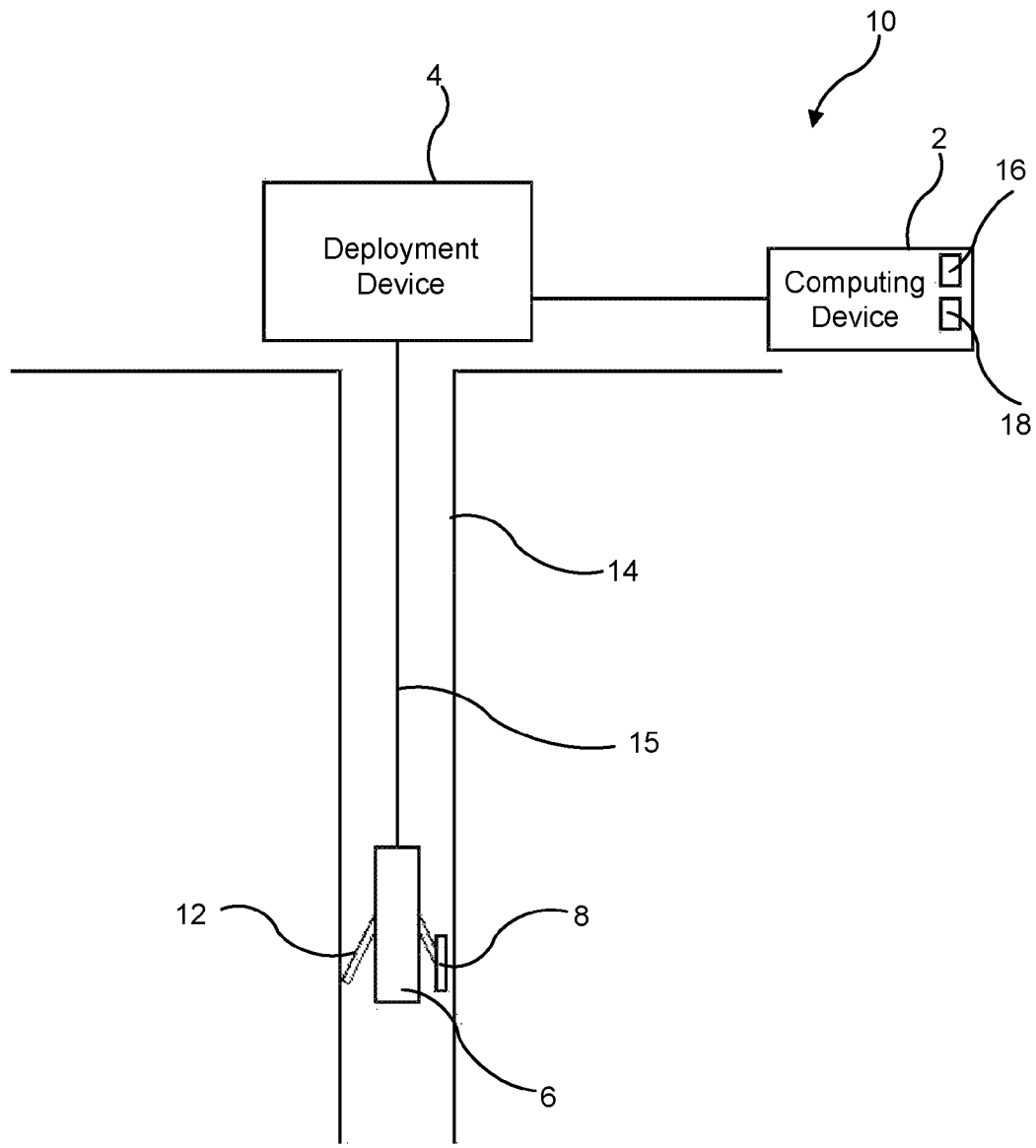
FIG. 1B depicts a block diagram of an embodiment of a system for measuring a property of a borehole, according to an embodiment of the invention.

Referring to FIG. 1B, illustrated is a system 10 for measuring a property of a borehole 14. The measured property may include the dielectric properties (e.g., permittivity, conductivity, permeability, and the like) of a geologic formation (e.g., rock formation) in a region within the borehole. This information may be used to measure a water volume of the measured region independent of the water resistivity, which may be used to determine a residual hydrocarbon volume in the borehole, and/or may be used to measure a hydrocarbon volume in low-resistivity or low-contrast shaly and laminated sand formations, water salinity, hydrocarbon volume and mobility in heavy oil reservoirs, and the like.

System 10 may include a computing device 2 that is located above ground. Computing device 2 may include a processor 16 and memory 18, which may receive information from a scanner device 6 placed within borehole 14. Scanner device 6 may include an elongate tool body that is placed adjacent a wall of the borehole 14. The scanner device 6 may be a nuclear magnetic resonance scanner, a dipole electric scanner, a multiphase flow meter, and the like. Computing device 2 may be communicatively coupled with the scanner device 6 so as to provide communication between the two devices. Scanner device 6 may be a wireline tool that is positioned within borehole 14 via deployment device 4. Deployment device 4 may be coupled with scanner device 6 via wireline 15, which may be used to lower scanner device 6 into borehole 14 or extracted scanner device 6 therefrom.

The scanner device 6 may be positioned adjacent the wall of borehole 14 by extending a deployable arm 12 laterally from scanner device 6 so as to contact an opposite wall of the borehole 14. The deployable arm 12 may push against the opposite wall of borehole 14 to force an antenna device 8 into contact with the wall of the borehole 14. The antenna device 8 may be laterally deployable from the scanner device 6 and/or rotatably coupled therewith to facilitate placement of the antenna 8 against the wall of the borehole 14.

The antenna device 8 may include one or more transmitters and receivers to transmit electromagnetic energy into the rock formation of the wall of the borehole 14 and receive signals in response to the transmitted electromagnetic energy. The signals, or a portion thereof, may be sent to the computing device 2 for analysis and/or measurement. As described herein, the antenna 8 may include a metamaterial element to enhance the signal received, enhance a focus of the transmitted electromagnetic energy, and/or enhance a transmission depth of the electromagnetic energy (e.g., a propagation depth of transmitted electromagnetic waves) within the wall of the borehole 14.

In operation, the scanner device 6 is lowered within the borehole 14 via the deployment device 4 and the deployable arm 12 is laterally deployed from the elongate body of scanner device 6 into contact with a wall of the borehole 14 so as to force antenna 8 against an opposite wall of the borehole 14. The antenna 8 may also be laterally deployed from the elongate body of the scanner device 6 so as to provide optimal contact with the borehole wall. The scanner device 6 is then extracted from the borehole 14 via the deployment device 4 while the antenna 8 transmits electromagnetic energy into the borehole wall and receives signals therefrom in response to the transmitted electromagnetic energy. Data may be provided to the computing device 2 as the scanner device 6 is extracted (or afterwards), which data may be analyzed and/or measured to determine the porosity, permeability, fluid content, and the like of the geologic formations within the borehole and thereby locate and/or determine hydrocarbon or other deposits within the geologic formation.

Figure 2A:
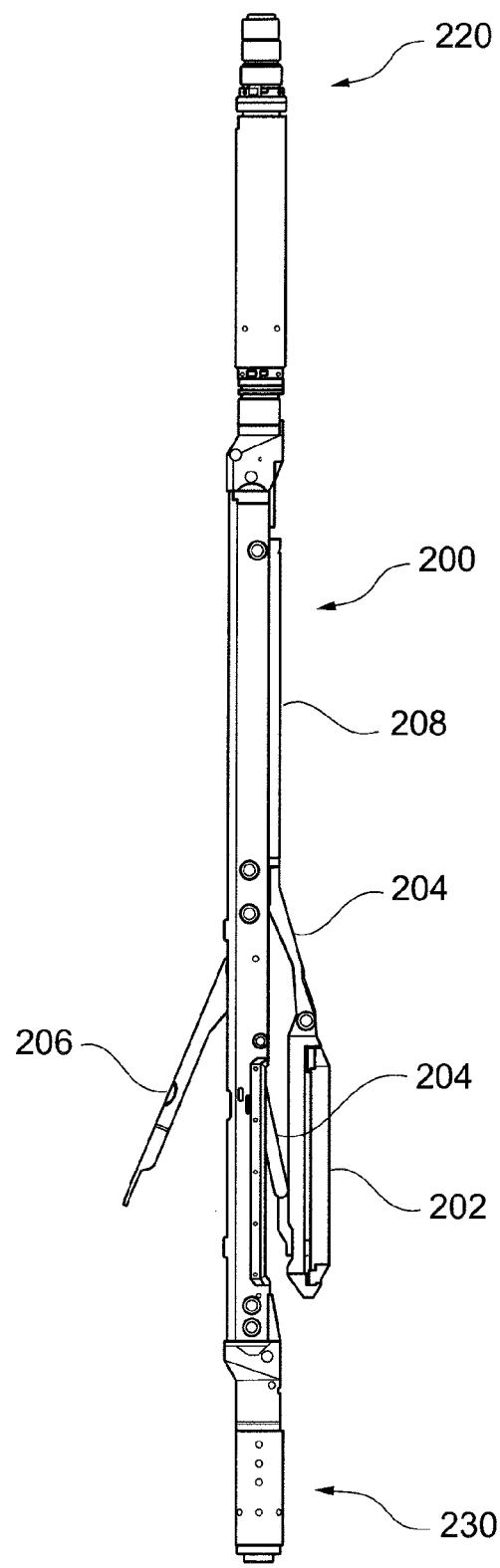
FIGS. 2A and 2B depict a front and side view of a scanner tool that may be used with the system of FIG. 1, according to an embodiment of the invention.
Figure 2B:
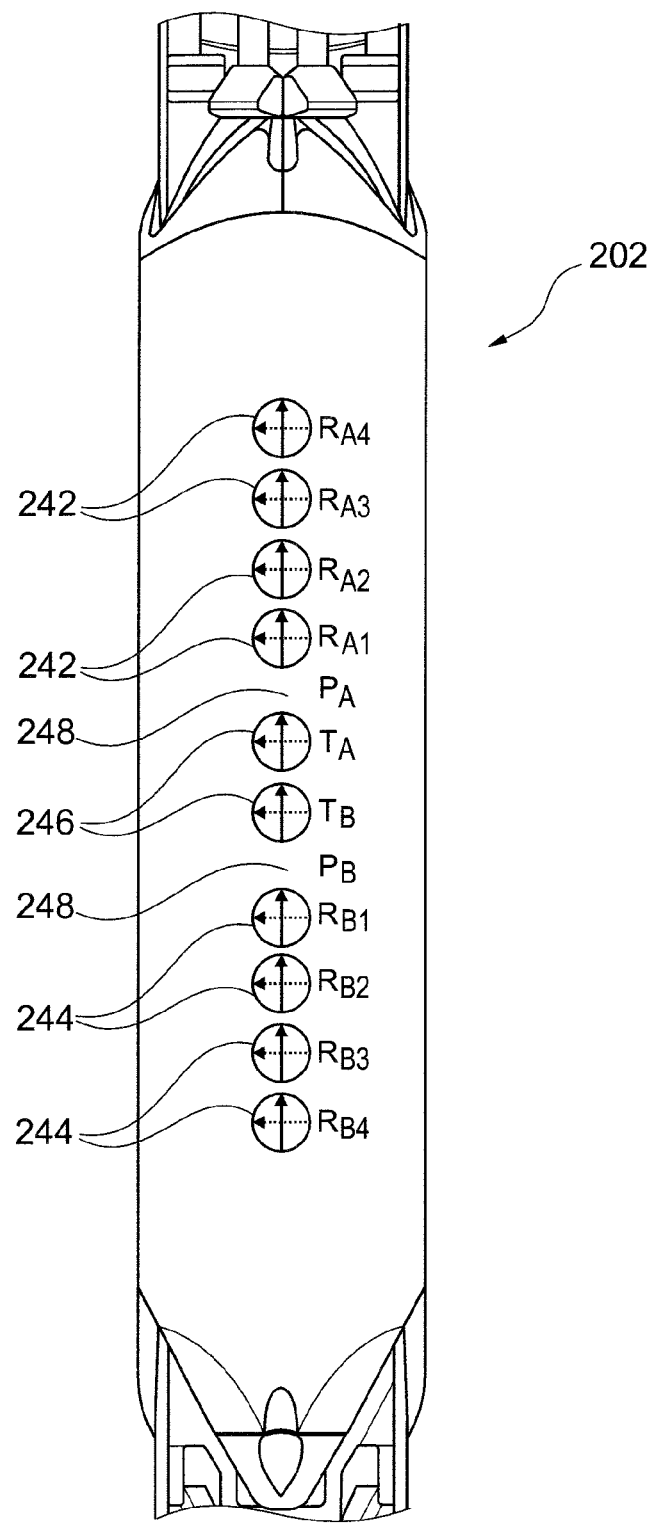

Referring now to FIGS. 2 and 2A, the figures illustrate a front and side view of a scanner device 200 (also referred to herein as an electromagnetic measurement tool) that may be used with the system 10 of FIG. 1 to measure a property of a borehole. The scanner device 200 may be a nuclear magnetic resonance scanner, a dipole electric scanner, a multiphase flow meter, and the like. The scanner device 200 includes an elongate tool body 208 that is configured for placement within the borehole. Specifically, a proximal end 220 of the scanner device 200 may be coupled with a wireline (not shown) and the device placed within a borehole (not shown) so that a distal end 230 is positioned down the borehole. The scanner device 200 may also include an articulated antenna 202 coupled with the elongate body 208. The antenna 202 is laterally deployable from the elongate body 208 by the extending arms 204. The extending arms 204 may be individually extendable so that the antenna 202 is able to rotate with respect to the elongate body 208. The antenna 202 may also be rotatable relative to the arms 204 so that the antenna 202 is rotatable about an axis of the borehole. Lateral deployment and rotation of the antenna 202 ensures that the antenna 202 is able to properly abut a wall of the borehole and provides optimal antenna contact with a wall of the borehole even when the wall is slightly rugose or angled with respect to the elongate body 208.

Placement of the antenna 202 against the borehole wall is further facilitated by the deployable arm 206, which extends from an opposite side of the elongate body 208 against an opposing wall of the borehole. As the deployable arm 206 is forced against the opposing wall, the antenna 202 is forced into contact with the borehole wall. A front surface of the antenna 202 that contacts the inner surface of the borehole may be semicircular so that the antenna conforms to the shape of the borehole and thereby further facilitates placement of the antenna against the borehole wall.

As shown in FIG. 2A, the antenna 202 may include an array of transmitters and receivers for transmitting and receiving signals, such as electromagnetic energy. Specifically, the antenna 202 includes a pair of transmitters 246 positioned near a center of the antenna with a plurality of receivers, 242 and 244, placed symmetrically around the transmitters for optimal measurement accuracy and borehole compensation. The antenna 202 also include a pair of electrical probes 248 positioned on either side of the transmitters 246 for determining mud and mudcake dielectric properties at a measured frequency and/or performing other quality control functions. In some embodiments, the transmitters 246 comprise cross-dipole antennas that transmit electromagnetic energy at two polarizations (e.g., longitudinal and transverse), which may be orthogonal or configured at any other angle. Similarly, the receivers, 242 and 244, may comprise cross-dipole antennas that receive signals at the two polarizations.

In some embodiments, by way of example, the transmitters 246 may transmit electromagnetic energy at four frequencies, which frequencies may range between about 20 MHz and 50 GHz, and more typically between about 20 MHz and about 4 GHz. Additional details of cross-dipole transmitters and receivers and antennas are provided in U.S. Pat. No. 5,406,206 titled "Method of Evaluating a Geological Formation Using a Logging Tool Including Slot Antenna Having Two Nonparallel Elements," PCT Application PCT/EP2008/004679 (International Publication No. WO 2009/010132) titled "System and Method to Measure Dielectric Constant in a Subterranean Wall," PCT Application PCT/EP2006/000776 (International Publication No. WO 2006/089618) titled "An Electromagnetic Probe," and PCT Application PCT/EP2008/004677 (International Publication No. WO 2009/006975) titled "A Tool for Downhole Formation Evaluation," the entire disclosures of which are incorporated herein by reference.

The antenna 202 may measure the dielectric properties of a geologic formation in the close neighborhood of the borehole. The measured response (i.e. the signals received at the receivers 242 and 244) may relate to the complex permittivity (equivalently the relative permittivity and conductivity) of the geologic formation, which may be used to determine a saturation, a porosity, a liquid permeability, a fluid content, and the like of the geologic formation.

Dielectric properties typically exhibit multiple relaxations that may originate from several sources. When energy is transmitted at low frequencies from the transmitters 246, interfacial polarization effects may be prominent and may make interpretation of the dielectric signals problematic. Transmitting at low frequencies, however, may provide an increased penetration depth of the electromagnetic energy within the geologic formation. In contrast, transmitting high frequency energy with the transmitters 246 may reduce the effects of interfacial polarization and may thus simplify the interpretation of the dielectric response. Transmitting at high frequencies, however, may reduce the penetration depth of the electromagnetic energy so that the measurement is mainly or substantially confined to the invaded formation. In other words, the higher the transmitted frequency, the simpler the interpretation while the lower the transmitted frequency, the greater the depth of penetration. Thus, there is often a tradeoff between: (i) measuring at a sufficiently high frequency so that interfacial polarization effects are minimized and the dielectric measurement are easily interpreted in terms of petro-physically important parameters (e.g., saturation), and (ii) depth of transmission or penetration of the electromagnetic energy. For example, at a frequency of about 1 GHz, the transmission/penetration depth may be on the order of about 5-10 cm. At this frequency the depth of investigation is low and may not be significant enough to probe an unaltered formation, especially when a wellbore exhibits significant invasion.

Further, the transmitters 246 may closely approximate an ideal dipole. As such the radiation field strength of the transmitted electromagnetic energy in the near field (i.e. within a few wavelengths of the antenna; at 1 GHz, wavelength in the porous media will be approx. 5 cm) may decline by a third power of the radius from the respective transmitter (e.g., the near field radiation strength is inversely proportional to the third power of the radius ($1/r^3$), where r represents the radial distance from the respective dipole transmitter). The sharp decline in the near field radiation strength may limit the power that may be supplied to increase a penetration depth of the electromagnetic energy. Thus, a mere increase in power may not be sufficient to increase a penetration or transmission depth of the electromagnetic energy. Rather, the penetration depth of the electromagnetic energy may be enhanced via more efficient utilization of the available power.

The radiation field strength of the transmitted electromagnetic energy in the far field (i.e., more than a few wavelengths of the antenna) may decline by a second power of the radius from the respective transmitter (e.g., $1/r^2$).

The power intensity a distance r from an aerial, may be approximated in 1 dimension by the formula below (Beer's law):

$$I=I_0\exp(-\beta r)\cdot f(r;\theta,\phi)$$

where: $I_0$ represents the power at the aerial, $\exp(-\beta r)$ expresses Beer's law with $\beta$ an absorption coefficient, and $f(r,\theta,\phi)$ the field distribution pattern. For a dipole in near field, $f \propto 1/r^3$, and in far field, $f \propto 1/r^2$. When adding a metamaterial structure, the function $f$ may be modified as shown in the formula below:

$$I=I_0\exp(-\beta r)\cdot\mathrm{meta}(f(r;\theta,\phi))$$

Metamaterials may allow design of the function meta( ) so as to shape the near field in a desired way using optical transformation theory. For the scanner devices described herein, (e.g., a dielectric scanner) a focusing structure may be chosen so as to take the dipole field and direct energy into one plane that includes the wellbore and receivers. In embodiments that involve an NMR scanner, a different function might be applicable that focuses RF energy into a beam normal to the wellbore. $I_0$ may be fixed by the transmitter electronics and $\beta$ may be part of the formation behavior that is being measured.

Figure 3:
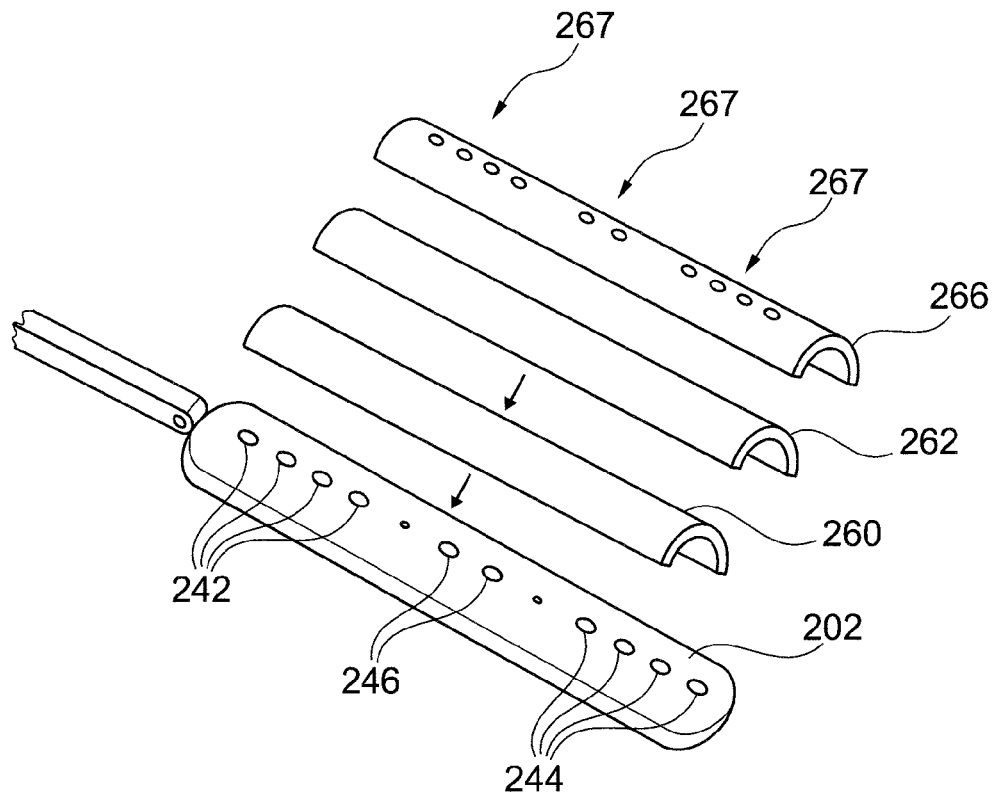
FIG. 3 depicts another embodiment of a scanner tool having a metamaterial element, according to an embodiment of the invention.
Figure 4:
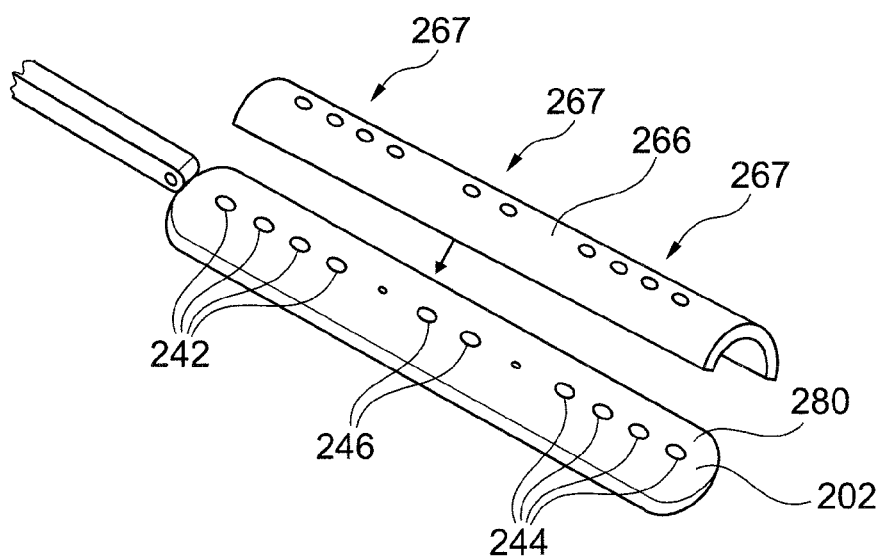
FIG. 4 depicts another embodiment of a scanner tool having a metamaterial element, according to an embodiment of the invention.

Referring now to FIGS. 3 and 4, the depth of penetration of transmitted electromagnetic energy (e.g., electromagnetic waves) of scanner tool 200 may be increased by positioning a lens 260 comprising a metamaterial atop antenna 202. The metamaterial lens 260 may be positioned atop transmitters 246 and/or receivers, 242 and 244, and function as a resonant layer to focus emitted energy and increase a transmission or penetration depth of the emitted energy into the wall of the borehole, which thereby enhances the signal received at the receivers 242 and 244 and subsequently measured by a computing device. In some embodiments, non-resonant metamaterials may be used to focus emitted energy and increase a transmission or penetration depth of the emitted energy into the wall of the borehole.

The metamaterial lens 260 may include an array of resonators sized smaller than the wavelength of a focused electromagnetic wave and a permeability and permittivity of at least one resonator may be negative at a resonance frequency or within a frequency range so as to focus the electromagnetic wave. The metamaterial lens 260 may focus emitted energy to a plane along the borehole and/or may increase the radiation field strength so that the transmitted electromagnetic energy declines by a square of the radius from the respective transmitter instead of by a third power (e.g., radiation field strength may be inversely proportional to the square of the radius ($1/r^2$), where r represents the radial distance from the respective transmitter). Such an increased field strength provides a significant enhancement in the penetration or transmission depth of the electromagnetic energy for a given power output.

The metamaterial lens 260 comprises a negative refractive index which allows the lens to be a small fraction of an emitted electromagnetic wavelength. Merely by way of example, in some embodiments, the negative refractive index value of the metamaterial lens 260 is between about −0.5 and about −6, and more commonly between about between about −1 and about −4. The metamaterial lens 260 may be a "left-handed" or doubly negative material, meaning the material is characterized by having both a negative relative permittivity and negative relative permeability. As described previously, the metamaterial lens 260 may be a synthetic or engineered material including an array of resonators whose permittivity ($\in$) and permeability ($\mu$) go negative at resonance or some defined non-resonant frequency. In some embodiments, the permittivity ($\in$), permeability ($\mu$), and or effective refractive index may be between about −2 and about −20 (and in some embodiments between about −5 and −15), which may match or closely approximate the absolute permittivity of the rock formation, fluid, or structure to be measured and thereby optimize transmission of the electromagnetic energy. In other words, the refractive index of the metamaterial element of the scanner device may numerically match the refractive index of the rock and/or fluid formation (e.g., an average saturation refractive index) being investigated and/or measured (i.e., the absolute values of the indexes may match) so as to minimize an impedance mismatch between the scanner device and the formation. For example, the metamaterial may be designed to have a refractive index of approximately −10 to numerically match a refractive index of the rock of approximately +10 (i.e., the absolute value of both indices is approximately 10).

In some embodiments, these resonators are sized less than an emitted wavelength, and in some aspects may be less than $1/10$ the emitted wavelength, and configured so that the metamaterial lens 260 includes a desired property. For example, the metamaterial lens 260 may be configured to enhance and/or focus emitted electromagnetic energy within a desired frequency range, such as around 1 GHz (e.g. between about 950 MHz and about 1.05 GHz). As such, electromagnetic energy emitted near 1 GHz would be focused and a depth of transmission or penetration of the electromagnetic energy within the borehole increased while electromagnetic energy emitted at lower or higher frequencies remain essentially unaffected. Likewise, the metamaterial lens 260 may be configured to enhance and/or focus electromagnetic energy emitted with a desired polarization (e.g., longitudinal polarization) so that electromagnetic energy emitted with substantially equivalent polarization are focused while electromagnetic energy emitted with other polarizations (e.g., transverse polarization) remain essentially unaffected. In some embodiments, the metamaterial lens 260 includes a combination of polarization and frequency filtering.

Figure 8A:
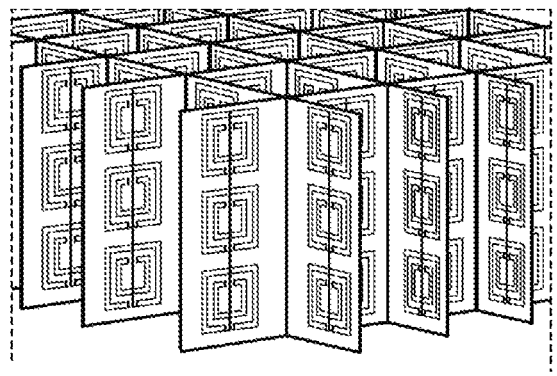
FIGS. 8A-8C illustrate split ring resonators and wires arranged on a sheet and sheets arranged to form a flat lens that may be used in the embodiments described herein.
Figure 8B:
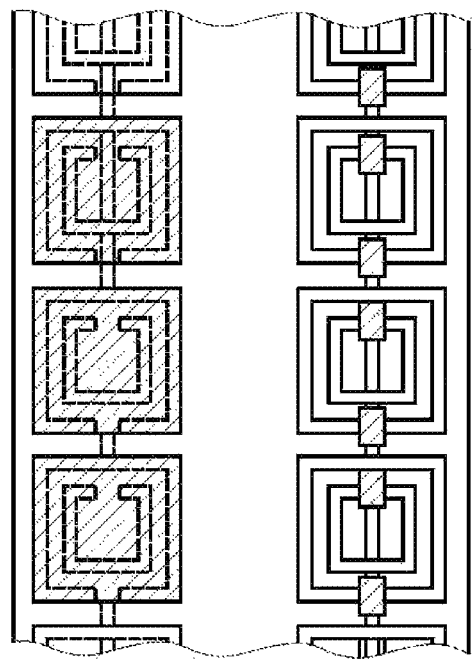
Figure 8C:
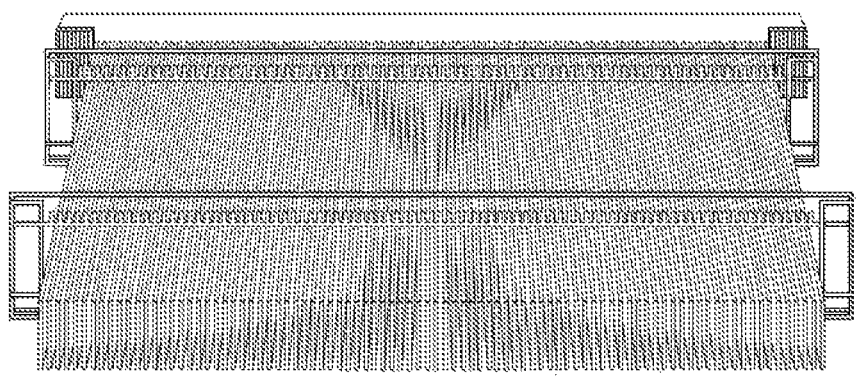

Metamaterial RF lenses may be constructed from standard metals and dielectrics. Early metamaterial devices were constructed as arrays of wires (−ve $\mu$) and split-ring-resonators (−ve $\in$). These structures may be fabricated on PCB's and assembled into 3D structures. Other structures have been made including "swiss roll" of dielectric and metal, nano rods, loaded waveguides, etc. Examples of such metamaterial lenses are shown in FIGS. 8A-C. FIG. 8B shows split ring resonators and wires on a sheet and FIGS. 8A & 8C show such sheets stacked to make a flat lens.

For the scanner devices described herein, the split ring resonators (SRR) and/or rods may lie in a plane that wraps around the lens, 260 and/or 262, and/or outer surface of the antenna 202. Several other structures known in the art may be used for the metamaterial element instead of or in addition to those shown in FIG. 8. Regardless of the element used, in certain aspects, the overall dimension of the metamaterial lens may be less than approximately $1/3$ of a wavelength, and in some embodiments may be less than $1/10$ of a wavelength of an emitted electromagnetic wave.

The use of the metamaterial lens 260 having a negative refractive index may allow the near field of the antenna 202 to be manipulated so as to obtain a "perfect" lens, or in other words, a lens that is not constrained by a diffraction limit. The implication is that a lens of dimension significantly less than a wavelength can be constructed, placed atop, disposed adjacent to the antenna 202, and positioned within a borehole. Further, the metamaterial lens 260 may reduce the size of the effective antenna, provide directional enhancements, and/or the like.

As shown in FIG. 3, an additional metamaterial lens 262 may be positioned atop the antenna 202 and positioned atop the metamaterial lens 260. The metamaterial lens 262 may be configured to focus electromagnetic energy emitted within a frequency range different than the frequency range focused by the metamaterial lens 260. For example, the metamaterial lens 262 may focus electromagnetic energy emitted within a frequency of about 400 MHz to about 500 MHz while the metamaterial lens 260 focuses electromagnetic energy emitted within a frequency of about 3.9 GHz to about 4.1 GHz. Likewise, the metamaterial lens 262 may focus electromagnetic energy emitted with a polarization substantially equivalent to or different from the polarization of electromagnetic energy focused by the metamaterial lens 260.

In an exemplary embodiment, the antenna 202 may be designed to emit electromagnetic energy at four specified frequencies between about 20 MHz and about 4 GHz and the antenna includes four metamaterial lens that each focus electromagnetic energy at one of the four frequencies. Thus, each of the electromagnetic energy emitted from the antenna 202 are focused by one of the metamaterial lenses.

Further, although the metamaterial lens 260 and/or 262 is shown in FIG. 3 covering both the transmitters 246 and the receivers 242 and 244, the metamaterial lens 260 and/or 262 may be positioned to only cover a portion of the antenna 202. For example, the metamaterial lens 260 may only cover the transmitters 246 and not receivers 242 and 244 or may cover the transmitters 246 and either receivers 242 or 244. Such an embodiment may prevent alignment errors or issues with the receivers.

As shown in FIG. 4, a metamaterial coating 280 may be applied atop the transmitters 246 and/or the receivers 242 and 244 instead of or in addition to placing a separate lens, such as lens 260, atop antenna 202. Thus, the metamaterial lens 260 may be an integral part of the antenna 202 and not a separate component. The metamaterial coating 280 may focus electromagnetic energy emitted within a desired frequency and/or having a desired polarization as described previously. Further, additional metamaterial coatings may be applied so that each metamaterial layer focuses electromagnetic energy within a desired frequency and/or polarization as described previously. The metamaterial coating 280 may be applied to cover both the transmitters 246 and the receivers, 242 and 244, or may be applied to only cover a portion of the antenna 202, such as only covering the transmitters 246 or covering the transmitters 246 and either the receivers 242 or 244. The antenna 202, may further include a combination of a metamaterial coating 280 and the metamaterial lens 260.

An outer shell 266 may be positioned atop the metamaterial lens, 260 and/or 262, and/or the metamaterial coating 280. The outer shell 266 may comprise a hard material that is designed to contact the wall of the borehole when the antenna 202 is forced into contact with the borehole wall. The outer shell 266 may protect the metamaterial lens 260/262, the metamaterial coating 280, and/or the antenna 202 from being damaged by the borehole wall as the antenna is forced against the wall and/or extracted from the borehole. The outer shell 266 may include a series of apertures 267 aligned with the transmitters 246 and/or the receivers 242 and 244 so as not to interfere with signals transmitted and received by the antenna.

In some embodiments, the metamaterial lens 260 and/or the metamaterial coating 280 may comprise a thickness of between about 0.5 mm and about 36 mm, and in some aspects may comprise thicknesses in the range of between about 1 mm and about 13 mm. In addition, the metamaterial lens 260 may in some aspects have a semicircular cross section corresponding to the cross section of the outer surface of antenna 202 so that the metamaterial lens 260 directly abut the outer surface of the antenna 202. Likewise, the semicircular cross section may correspond to a cross section of the outer shell 266 so that the outer shell 266 directly abuts the outer surface of the metamaterial lens 260. In some embodiments, the semicircular cross section of the metamaterial lens 260 comprises a radius of between about 5 cm and about 10 cm, and more in some aspects between about 5 cm and about 7.5 cm.

Figure 5:
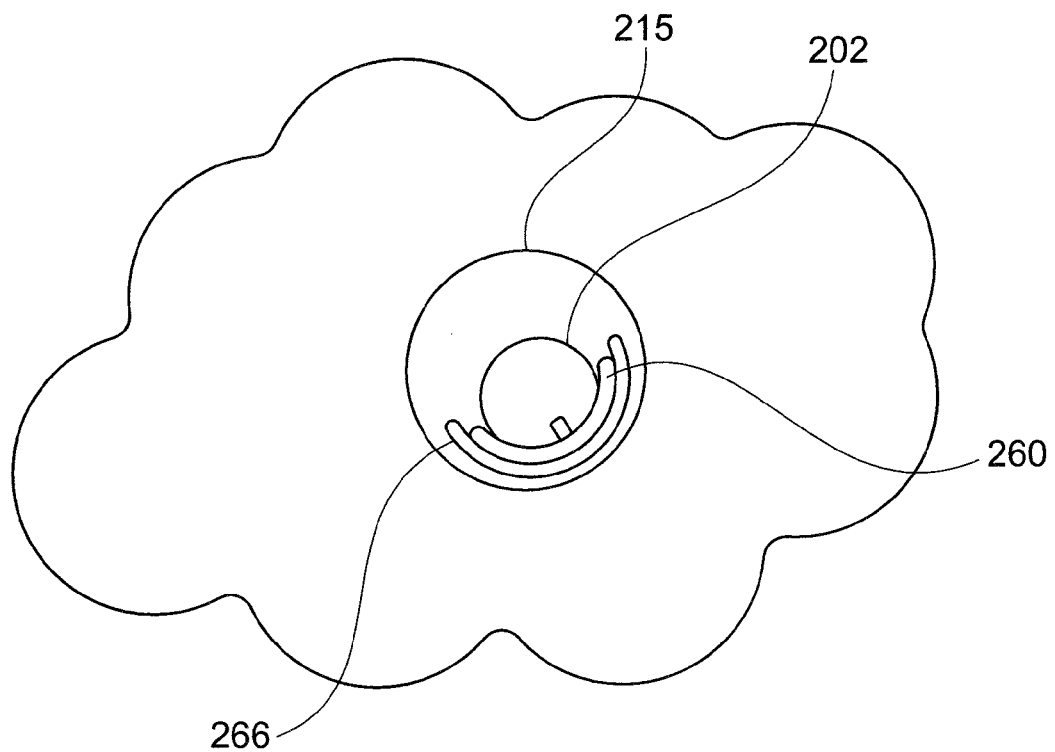
FIG. 5 depicts a cross-sectional view of a scanner tool placed within a borehole, in accordance with an embodiment of the present invention

Referring now to FIG. 5, illustrated is a scanner tool 200 placed within a borehole 215 and positioned against a wall of borehole 215. A metamaterial element, such as the lens 260 or the metamaterial coating 280, is positioned atop the transmitters (not shown) and receivers (not shown) of the antenna 202 to focus electromagnetic energy emitted from the antenna 202 and thereby increase a penetration depth of the emitted electromagnetic energy within the wall of borehole 215. An outer shell 266 is positioned atop the metamaterial element to protect the metamaterial element from being damaged by the wall of the borehole 215. The metamaterial element may focus electromagnetic energy (e.g., transmitted electromagnetic waves) in one direction, which may be a plane normal to the borehole. In other words, the metamaterial element may focus the electromagnetic energy so that electromagnetic waves propagate or electromagnetic energy is enhanced along a plane normal to the borehole. Such single direction focusing may prevent the electromagnetic decoupling of the transmitter and the receiver. In embodiments that include magnetic resonance devices (e.g., NMR devices), the transmitter coil may also be the receiver and two direction focusing would be beneficial since the transmitter and receiver are co-located.

Figure 6:
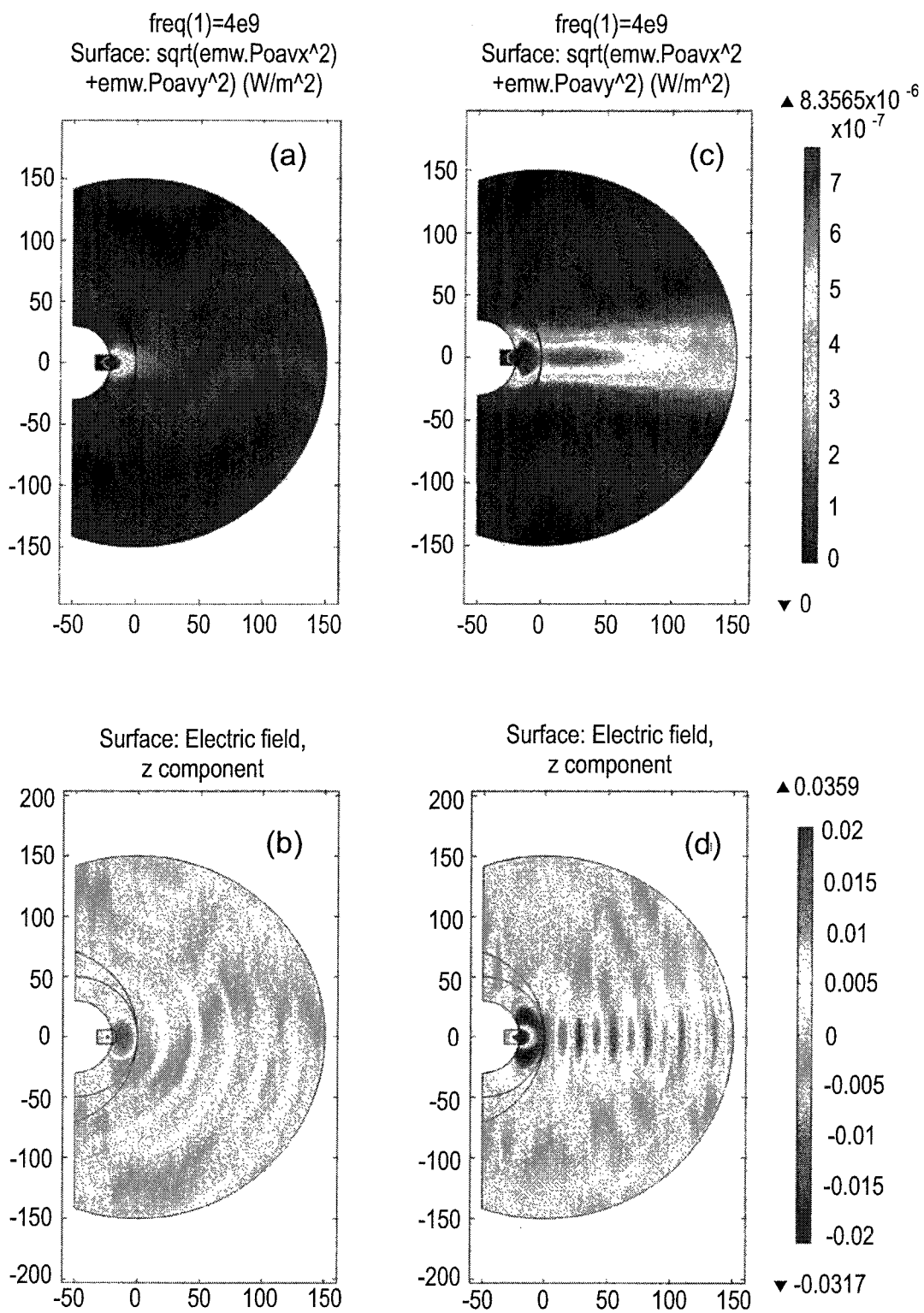
FIG. 6 depicts the enhanced field distribution using a scanner tool having a metamaterial element, according to an embodiment of the invention.

Referring now to FIG. 6, illustrated is a model of an enhanced measurement using a scanner tool having a metamaterial element. A permittivity of 8 (corresponding to a carbonate rock) was selected for the modeled rock formation and a permittivity of 3 was selected for the wellbore, which is approximately the permittivity of oil-based mud (OBM). The metamaterial element was modeled having a permeability of $\mu_r = -2.2 + 0.001i$ and a permittivity of $\in_r = -2.2 + 0.001i$, resulting in an effective refractive index of $n = -2.2$. The modeled emitted frequency was about 4 GHz. The average power flux and electric field E were calculated.

Models (a) and (b) represent the results determined for a scanner tool that did not include a metamaterial element (e.g., lens or coating). For the sake of direct comparison, for this calculation the metamaterial layer was removed and replaced with wellbore material (permittivity=3). Thus the transmitter stayed in the identical location relative to the wellbore in all cases. Model (a) illustrates the time averaged power flux within the wall of the wellbore while model (b) illustrates the electric field E. The expected dipole field, modified by proximity to a conductive plane, is seen.

Models (c) and (d) represent the results determined for a scanner tool that includes the metamaterial element (e.g., lens or layer) described above. Model (c) illustrates an increased time averaged power flux within the wall of the wellbore due to the focused electromagnetic energy. Similarly, model (d) illustrates an increased electric field E within the wellbore. In Models (c) and (d) a very clear focusing effect is observed significantly increasing the power deployed in a direction normal to the wellbore.

Figure 9:
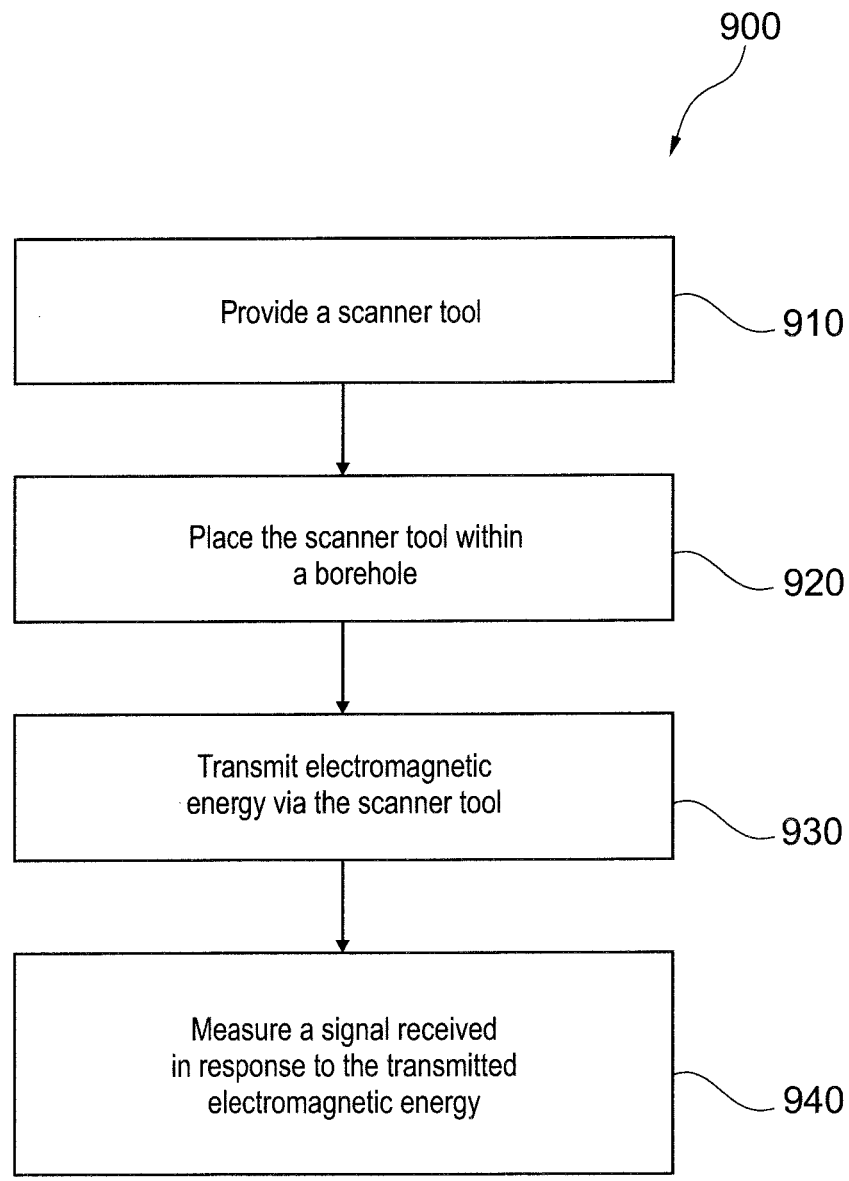
FIG. 9 illustrates a flowchart of an embodiment of a process for enhancing a signal of an electromagnetic measurement tool for measurements in a borehole.

Referring now to FIG. 9, illustrated is a flowchart 900 of an embodiment of a process for enhancing a signal of an electromagnetic measurement tool for measurements in a borehole. At block 910, a scanner tool (i.e., an electromagnetic measurement tool or the like) is provided. The scanner tool may be a wireline tool that is deployable within a borehole to measure one or more properties associated with a rock formation of the borehole for oil exploration. The scanner tool may include a nuclear magnetic resonance scanner (NMR scanner), a dipole electric scanner (dielectric), a multiphase flow meter, and the like.

The scanner tool may include a transmitter that transmits one or more electromagnetic energy, a receiver that receives the electromagnetic energy or a signal associated with the electromagnetic energy, and a metamaterial element operable with the transmitter and having a negative refractive index as described herein. The transmitter, receiver, and metamaterial element may be components of an antenna that is laterally deployable from a main body of the scanner tool to a position adjacent a wall of the borehole as described herein. The metamaterial element may focus the transmitted electromagnetic energy or otherwise increase a depth of transmission or penetration of the electromagnetic energy within a geologic formation of the borehole. At block 920, the scanner tool may be placed within the borehole. At block 930, one or more electromagnetic energy may be transmitted into the borehole via the transmitter and at block 940, the electromagnetic energy (or a signal associated with the electromagnetic energy) may be received with the receiver in response to the transmitted electromagnetic wave(s). The transmission or penetration depth and/or focus of the transmitted electromagnetic energy into the borehole may be increased due to the metamaterial so that the signal received at the receiver is enhanced and/or a measurement of a property of the borehole is enhanced.

In some embodiments, the metamaterial element includes an array of resonators sized smaller than the wavelength of a focused electromagnetic wave, where the permeability and permittivity of at least one resonator is negative at a resonance frequency so as to focus the electromagnetic wave. Further, the metamaterial element may focus electromagnetic energy transmitted within a first frequency range and an additional metamaterial element may be positioned atop the transmitter to focus electromagnetic energy transmitted within a second frequency range different than the first frequency range.

In some embodiments, the metamaterial element focuses electromagnetic energy in the range between about 20 MHz and about 50 GHz, while in other embodiments the focused electromagnetic energy range between about 20 MHz and about 4 GHz. The metamaterial element may focus one or more of the electromagnetic energy based on a polarization of the electromagnetic energy, such as a longitudinal or transverse polarization. The negative refractive index value of the metamaterial element may be between about −1 and about −4.

Figure 10:
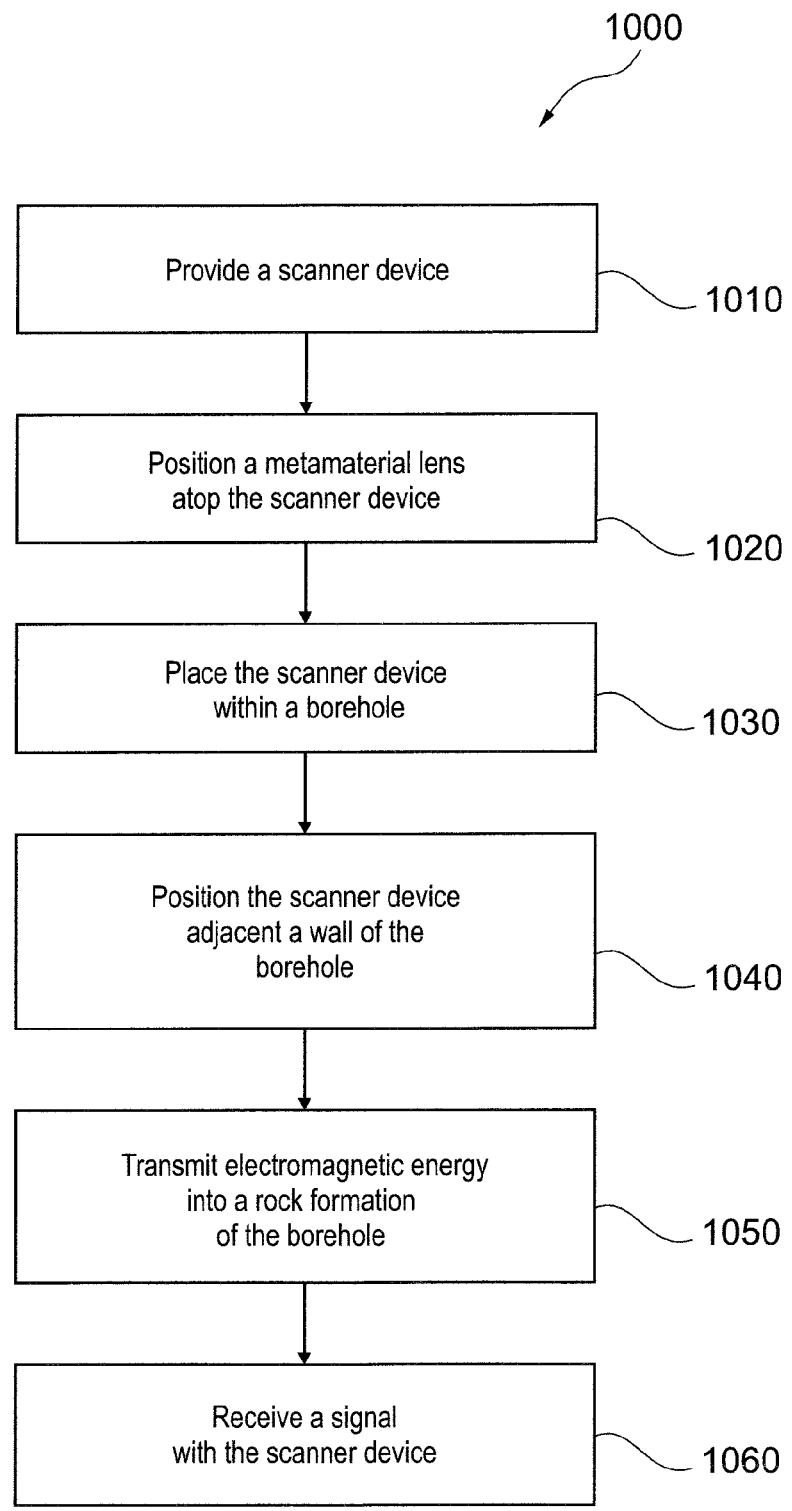
FIG. 10 illustrates a flowchart of an embodiment of enhancing a measurement of a scanner device in a borehole.

Referring now to FIG. 10, illustrated is a flowchart 1000 of an embodiment of enhancing a measurement of a scanner device in a borehole. At block 1010, a scanner device is provided. The scanner device may be configured to transmit electromagnetic energy into a rock formation within the borehole. At block 1020, a metamaterial element may be positioned atop the scanner device. The metamaterial element may have a negative refractive index, which may enhance a penetration depth of the transmitted electromagnetic energy within a rock formation of the borehole. At block 1030, the scanner device may be placed within the borehole. At block 1040, the scanner device may be positioned adjacent a wall of the borehole. At block 1050, electromagnetic energy may be transmitted via the scanner device into the rock formation within the borehole and at block 1060, a signal (e.g., electromagnetic energy) may be received via a receiver of the scanner device to measure a property of the rock formation.

A depth measurement of the signal may be enhanced by the enhanced penetration of the electromagnetic energy within the rock formation. In some embodiments, the metamaterial element comprises a metamaterial coating applied atop the scanner device, while in other embodiments, the metamaterial element comprises a lens or lenses separate from the scanner device that is positioned atop the scanner device.

Although the scanner device has been generally described herein as being used in wellbores, boreholes, and/or other down hole applications, it should be realized that the scanner device may also be used for above ground measurement and/or data gathering applications, such as for analyzing and/or measuring a wellbore core sample, fluid flow within a pipe (e.g., multiphase fluid flow), a suspension within a fluid, a fluid flowing within a rock formation (either within a wellbore or within a core sample), portions of an earth formation, porous matrix formations, and/or other rock or fluid formations. The scanner device may be positioned adjacent such solid bodies and/or fluids to measure and/or analyze them.

Figure 11:
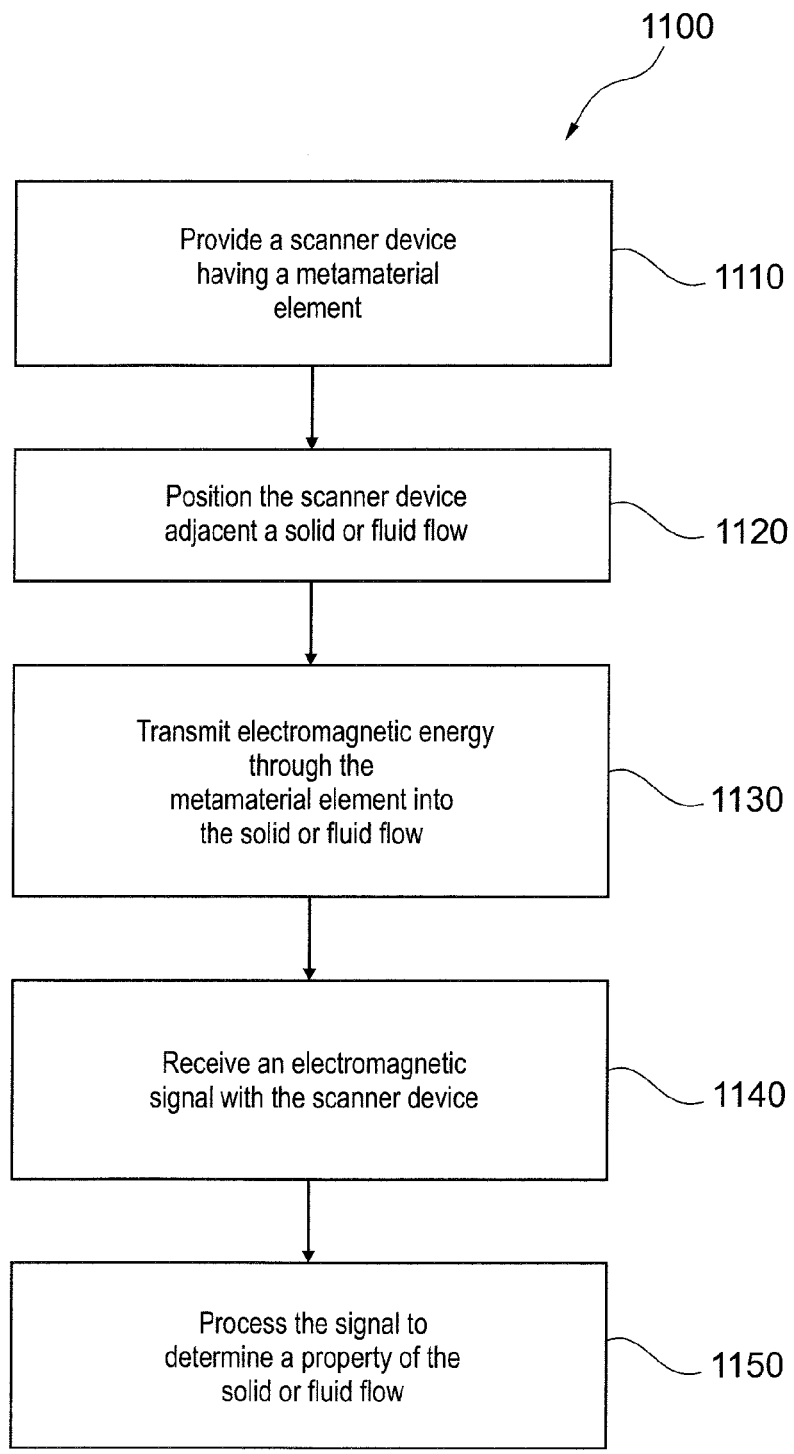
FIG. 11 illustrates a flowchart of an embodiment of enhancing a measurement of a scanner device positioned adjacent a solid or fluid flow.

Referring now to FIG. 11, illustrated is an embodiment of a method 1100 of enhancing a measurement of a scanner/investigative device positioned adjacent a solid or fluid flow. Method 1100 may describe measurement processes and/or data gathering applications that occur above ground. At block 1110, a scanner device having a metamaterial element or lens, such as those described herein, is provided. At block 1120, the scanner device is positioned adjacent a solid body or fluid flow. The solid body may include a wellbore core sample, a porous matrix formation, an earth formation, a solid material and/or the like. The fluid flow may include a fluid flow within a pipe, a suspension within a fluid, a fluid flowing within a rock formation, and/or the like. At block 1130, electromagnetic energy is transmitted through the metamaterial element or lens into the solid body or fluid flow. At block 1140, an electromagnetic signal or energy is received with the scanner device. At block 1150, the electromagnetic signal or energy may be processed to determine one or more properties of the solid body or fluid flow.

In the investigation of solid materials and fluid flows, the metamaterial properties, the index matching and/or the frequency ranges and/or the like described above, may be used to enhance the electromagnetic investigation of the solid material and/or the fluid flow. NMR and/or electromagnetic signals may be focused by the metamaterial lens into the solid material and/or the fluid flow to increase investigation depth. For example, electromagnetic signals may be focused through a pipe or the like to investigate a fluid therein. Electromagnetic energies may be reduced to look inside a solid, which solid may be a biological tissue or the like.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or group.

What is claimed is:

1. An electromagnetic measurement tool for measuring a property of a solid body or a fluid flow, the electromagnetic measurement tool comprising:
   a tool body; and
   an antenna coupled with the tool body and configured for placement adjacent the solid body or fluid flow, the antenna comprising:
   at least one transmitter configured to transmit electromagnetic energy with a frequency in a range from 20 MHz to 50 GHz;
   at least one receiver configured to receive the electromagnetic energy; and
   a metamaterial element comprising a negative refractive index and an array of resonators sized smaller than an emitted wavelength of the electromagnetic energy and configured to focus a wave of the electromagnetic energy from the at least one transmitter into the solid body or fluid flow based on a desired frequency range or a polarization of the electromagnetic energy;
   wherein the electromagnetic measurement tool is configured to measure a property of one or more of a porous matrix that may include a fluid and/or a mineral, a rock formation, a rock core, a fluid flowing in a pipe, a fluid sample, and a fluid flowing in a wellbore.

2. The electromagnetic measurement tool of claim 1, wherein the solid body comprises a porous matrix.

3. The electromagnetic measurement tool of claim 2, wherein the porous matrix comprises a fluid and a mineral.

4. The electromagnetic measurement tool of claim 1, wherein the solid body comprises a rock formation or a rock core.

5. The electromagnetic measurement tool of claim 1, wherein the fluid is a fluid flowing in a pipe.

6. The electromagnetic measurement tool of claim 5, wherein the fluid comprises one or more selected from the group consisting of: oil, water, a multiphase fluid, and gas.

7. The electromagnetic measurement tool of claim 1, wherein the metamaterial element comprises a material having a negative relative permittivity and a negative relative permeability over a range of frequencies.

8. The electromagnetic measurement tool of claim 1, wherein the metamaterial element comprises a lens positioned atop the antenna.

9. The electromagnetic measurement tool of claim 8, further comprising an outer shell positioned atop the metamaterial lens, wherein the outer shell contacts a wall of a borehole when the electromagnetic measurement tool is positioned within the borehole.

10. The electromagnetic measurement tool of claim 8, wherein the lens is not positioned over the receiver.

11. The electromagnetic measurement tool of claim 8, wherein the lens comprises a thickness of between about 1 mm and about 13 mm.

12. The electromagnetic measurement tool of claim 11, wherein the metamaterial lens comprises a semicircular configuration having a radius of between about 5 cm and about 10 cm.

13. The electromagnetic measurement tool of claim 1, wherein the metamaterial element comprises a coating applied atop the antenna.

14. The electromagnetic measurement tool of claim 1, wherein the tool body comprises an elongate tool body configured for placement within the borehole, and wherein the antenna is configured for placement adjacent a wall of the borehole.

15. The electromagnetic measurement tool of claim 14, wherein the electromagnetic measurement tool comprises a wireline tool deployable within the borehole to measure properties associated with a rock formation for oil exploration.

16. The electromagnetic measurement tool of claim 14, wherein the elongate tool body further comprises an arm laterally deployable against a second wall to force the antenna into contact with the wall.

17. The electromagnetic measurement tool of claim 14, wherein the antenna is coupled with the elongate tool body so as to be laterally deployable from the elongate tool body.

18. The electromagnetic measurement tool of claim 17, wherein the antenna is rotatable relative to the elongate tool body.

19. The electromagnetic measurement tool of claim 14, wherein the metamaterial element focuses the electromagnetic energy from the transmitter along a plane normal to the borehole.

20. The electromagnetic measurement tool of claim 1, wherein the antenna further comprises a second metamaterial element that focuses electromagnetic energy within a frequency range different than a frequency range of electromagnetic energy focused by the metamaterial element.

21. The electromagnetic measurement tool of claim 1, wherein an absolute value of the refractive index of the metamaterial element is substantially equivalent to an absolute value of the refractive index of the solid body or fluid.

22. The electromagnetic measurement tool of claim 1, wherein the metamaterial element focuses the electromagnetic energy from the transmitter into a plane.

23. A system for measuring a property of a geologic formation penetrated by a borehole, the system comprising:

a computing device comprising a processor and memory, the computing device configured to measure the property of the borehole;
   a deployment device configured to deploy one or more tools within the borehole; an elongate tool body coupled with the deployment device for placement of the elongate tool body within the borehole; and
   an antenna coupled with the elongate tool body and communicatively coupled with the computing device, the antenna comprising:
   at least one transmitter configured to transmit electromagnetic energy with a frequency in a range from 20 MHz to 50 GHz;
   at least one receiver configured to receive the electromagnetic energy and to provide information associated with the electromagnetic wave to the computing device to measure the property of the borehole; and
   a metamaterial element having a negative refractive index that focuses the electromagnetic energy via an array of resonators sized smaller than a wavelength of the electromagnetic energy, from the transmitter into the geologic formation around the borehole based on a desired frequency range and/or a polarization of the electromagnetic energy;
   wherein the electromagnetic measurement tool is configured to measure a property of one or more of a porous matrix that may include a fluid and/or a mineral, a rock formation, a rock core, a fluid flowing in a pipe, a fluid sample, and a fluid flowing in a wellbore.

24. The system of claim 23, wherein the antenna is coupled with the elongate tool body so as to be laterally deployable from the elongate tool body such that the antenna is positionable adjacent a wall of the borehole.

25. The system of claim 24, wherein the elongate tool body further comprises an arm laterally deployable against a second wall to force the antenna into contact with the wall.

26. A method of enhancing a measurement of a property of a solid body or a fluid flow, the method comprising:
   providing an electromagnetic measurement tool comprising:
      a transmitter configured to transmit electromagnetic energy with a frequency in a range from 20 MHz to 50 GHz;
      a receiver configured to receive the electromagnetic energy; and
      a metamaterial element comprising a negative refractive index;
   placing the electromagnetic measurement tool adjacent a solid body or fluid;
   transmitting electromagnetic energy via the transmitter through the metamaterial element into the solid body or fluid flow with the metamaterial element focusing the electromagnetic energy via an array of resonators sized smaller than a wavelength of the electromagnetic energy, from the transmitter into the solid body or fluid based on a desired frequency range and/or a polarization of the electromagnetic energy into the solid body or fluid flow; and
   receiving the electromagnetic energy with the receiver to measure a property of the solid body or fluid comprising one or more of a porous matrix that may include a fluid and/or a mineral, a rock formation, a rock core, a fluid flowing in a pipe, a fluid sample, and a fluid flowing in a wellbore.

27. The method of claim 26, wherein the metamaterial element focuses electromagnetic energy in the range between about 20 MHz and about 4 GHz.

28. The method of claim 26, wherein the negative refractive index comprises a value between about −1 and about −20.

29. The method of claim 26, wherein the negative refractive index comprises a value between about −1 and about −4.

30. The method of claim 26, further comprising configuring the metamaterial element so that an absolute value of the refractive index of the metamaterial element is substantially equivalent to an absolute value of the refractive index of the solid body or fluid.

31. The method of claim 26, wherein the metamaterial element focuses the electromagnetic energy based on a frequency or a polarization of the electromagnetic energy.

32. The method of claim 26, wherein the metamaterial element focus electromagnetic energy transmitted within a first frequency range, and wherein the method further comprises:
   positioning an additional metamaterial element atop the transmitter, the additional metamaterial element focusing electromagnetic energy transmitted within a second frequency range different than the first frequency range.

33. The method of claim 26, wherein the metamaterial element comprises a lens separate from the transmitter and receiver.

34. The method of claim 26, wherein the metamaterial element comprises a metamaterial coating.

35. The method of claim 26, further comprising placing the electromagnetic measurement tool within a borehole to measure properties associated with a rock formation for oil exploration.

36. The method of claim 26, wherein the electromagnetic measurement tool comprises a nuclear magnetic resonance scanner, a dipole electric scanner, or a multiphase flow meter.

37. The method of claim 26, wherein the metamaterial element comprises an array of resonators sized smaller than the wavelength of a focused electromagnetic wave, and wherein the permeability and permittivity of at least one resonator is negative at a resonance frequency.

38. The method of claim 26, wherein the metamaterial element focuses the electromagnetic energy from the transmitter into a plane.

39. The method of claim 26, wherein the tool comprises one or more transmitters configured to transmit electromagnetic energy at a plurality of frequencies, and also comprise a plurality of metamaterial elements that focus electromagnetic energy within a plurality of different frequency ranges.

40. A method for enhancing a measurement of a property of a solid body or a fluid flow with a scanner device in a borehole comprising:
   providing a scanner device configured to transmit electromagnetic energy into a geologic formation around the borehole;
   positioning a metamaterial element comprising a negative refractive index atop the scanner device, the metamaterial element enhancing a penetration of the electromagnetic energy into the geologic formation;
   placing the scanner device within the borehole;
   positioning the scanner device adjacent a wall of the borehole;
   transmitting electromagnetic energy, with a frequency in a range from 20 MHz to 50 GHz via the scanner device, through the metamaterial element via an array of resonators sized smaller than a wavelength of the electromagnetic energy, from the transmitter into the geologic formation around the borehole based on a desired frequency range or a polarization of the electromagnetic energy; and receiving a signal via a receiver of the scanner device in response to the transmitted electromagnetic energy to measure a property of the geologic formation;

wherein the electromagnetic measurement tool is configured to measure a property of one or more of a porous matrix that may include a fluid and/or a mineral, a rock formation, a rock core, a fluid flowing in a pipe, a fluid sample, and a fluid flowing in a wellbore.

41. The method of claim 40, wherein a depth measurement of the signal is enhanced by the enhanced penetration of the electromagnetic energy within the geologic formation.

42. The method of claim 40, wherein the metamaterial element is coated atop the scanner device.

43. The method of claim 40, wherein the metamaterial element comprises at least one lens separate from the scanner device that is positioned atop the scanner device.

* * * * *